US008634521B2

(12) United States Patent
Grigsby et al.

(10) Patent No.: US 8,634,521 B2
(45) Date of Patent: *Jan. 21, 2014

(54) VOICE RESPONSE UNIT SHORTCUTTING

(75) Inventors: Travis M. Grigsby, Austin, TX (US); Frank L. Jania, Chapel Hill, NC (US); Steven M. Miller, Cary, NC (US); Lisa A. Seacat, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/590,641

(22) Filed: Aug. 21, 2012

(65) Prior Publication Data
US 2012/0314848 A1    Dec. 13, 2012

Related U.S. Application Data

(63) Continuation of application No. 12/202,682, filed on Sep. 2, 2008, now Pat. No. 8,290,125.

(51) Int. Cl.
*H04M 11/06* (2006.01)
*G06Q 50/00* (2012.01)
*G08B 29/00* (2006.01)

(52) U.S. Cl.
USPC .... 379/88.18; 340/7.29; 340/506; 348/14.07; 379/88.04; 379/88.22; 379/100.01; 379/201.04; 379/266.01; 455/414.1; 455/445; 705/2

(58) Field of Classification Search
USPC ............ 340/7.29, 506; 348/14.07; 379/88.01, 379/88.03, 88.04, 88.13, 88.14, 88.16, 379/88.18, 88.22, 88.23, 93.17, 100.01, 379/201.04, 266.01, 88.12, 93.26, 93.34, 379/201.12, 201.03, 265.13; 455/414.1, 455/445; 705/2
See application file for complete search history.

(56) References Cited

U.S. PATENT DOCUMENTS

| | | | | |
|---|---|---|---|---|
| 5,561,703 A * | 10/1996 | Arledge et al. | ............... | 340/7.29 |
| 5,802,526 A * | 9/1998 | Fawcett et al. | ............. | 379/88.13 |
| 5,864,605 A * | 1/1999 | Keshav | ..................... | 379/88.01 |
| 5,946,377 A | 8/1999 | Wolf | | |
| 6,016,336 A * | 1/2000 | Hanson | ...................... | 379/88.23 |

(Continued)

FOREIGN PATENT DOCUMENTS

| | | |
|---|---|---|
| KR | 20000072653 | 12/2000 |
| KR | 10-0451097 | 12/2004 |

OTHER PUBLICATIONS

United States Patent and Trademark Office, Office Action for U.S. Appl. No. 12/211,653, Apr. 15, 2011, pp. 1-11, Alexandria, VA, USA.

(Continued)

*Primary Examiner* — Gerald Gauthier
(74) *Attorney, Agent, or Firm* — Lee Law, PLLC; Christopher B. Lee

(57) ABSTRACT

Call specific information input by a user and user information pre-stored in a database are mapped to a voice response unit (VRU) map associated with a targeted VRU. A call with the targeted VRU is initiated and the targeted VRU is navigated to an option associated with a user goal input by the user. The VRU map is displayed and progress of the navigation of the targeted VRU is displayed to the user during the call on the displayed VRU map as the VRU is navigated.

21 Claims, 3 Drawing Sheets

(56) References Cited

U.S. PATENT DOCUMENTS

| | | | |
|---|---|---|---|
| 6,058,179 A | 5/2000 | Shaffer et al. | |
| 6,091,805 A * | 7/2000 | Watson | 379/93.17 |
| 6,131,810 A | 10/2000 | Weiss et al. | |
| 6,354,490 B1 | 3/2002 | Weiss et al. | |
| 6,412,073 B1 | 6/2002 | Rangan | |
| 6,754,332 B1 | 6/2004 | Kneipp et al. | |
| 6,788,770 B1 * | 9/2004 | Cook et al. | 379/100.01 |
| 6,999,448 B1 | 2/2006 | Klein | |
| 7,065,188 B1 * | 6/2006 | Mei et al. | 379/88.23 |
| 7,092,509 B1 * | 8/2006 | Mears et al. | 379/266.01 |
| 7,113,200 B2 * | 9/2006 | Eshkoli | 348/14.07 |
| 7,180,985 B2 | 2/2007 | Colson et al. | |
| 7,215,743 B2 | 5/2007 | Creamer et al. | |
| 7,224,790 B1 * | 5/2007 | Bushey et al. | 379/265.13 |
| 7,272,212 B2 | 9/2007 | Eberle et al. | |
| 7,340,040 B1 * | 3/2008 | Saylor et al. | 379/67.1 |
| 7,386,103 B1 | 6/2008 | Chahal | |
| 7,509,266 B2 | 3/2009 | Rogers et al. | |
| 7,515,695 B1 | 4/2009 | Chan et al. | |
| 7,715,531 B1 | 5/2010 | Golding et al. | |
| 7,715,547 B2 | 5/2010 | Ibbotson et al. | |
| 7,742,580 B2 | 6/2010 | Cooper et al. | |
| 7,773,731 B2 * | 8/2010 | Malik et al. | 379/88.22 |
| 7,778,397 B2 * | 8/2010 | Erhart et al. | 379/88.14 |
| 7,809,376 B2 * | 10/2010 | Letourneau et al. | 455/445 |
| 7,881,443 B2 | 2/2011 | Langseth et al. | |
| 7,961,088 B2 * | 6/2011 | Watts et al. | 340/506 |
| 8,000,454 B1 * | 8/2011 | Or-Bach et al. | 379/88.18 |
| 8,009,813 B2 * | 8/2011 | Chang | 379/88.18 |
| 8,036,348 B2 * | 10/2011 | Kortum et al. | 379/88.18 |
| 8,050,392 B2 * | 11/2011 | Adams et al. | 379/93.34 |
| 8,051,369 B2 | 11/2011 | Zirngibl et al. | |
| 8,073,112 B2 | 12/2011 | Jaiswal et al. | |
| 8,094,788 B1 * | 1/2012 | Eberle et al. | 379/88.12 |
| 8,130,918 B1 * | 3/2012 | Zirngibl et al. | 379/88.22 |
| 8,131,524 B2 | 3/2012 | Bushey et al. | |
| 8,189,756 B2 * | 5/2012 | Bhogal et al. | 379/201.12 |
| 8,229,091 B2 * | 7/2012 | Romeo | 379/88.18 |
| 8,243,900 B2 * | 8/2012 | Kumhyr | 379/201.04 |
| 8,265,234 B2 * | 9/2012 | Singh | 379/88.04 |
| 8,290,125 B2 * | 10/2012 | Grigsby et al. | 379/88.18 |
| 8,340,257 B1 * | 12/2012 | Paczkowski et al. | 379/93.17 |
| 8,494,139 B2 * | 7/2013 | Byrne et al. | 379/201.03 |
| 2003/0074091 A1 | 4/2003 | Kim | |
| 2003/0099335 A1 * | 5/2003 | Tanaka et al. | 379/88.16 |
| 2003/0161449 A1 | 8/2003 | Plan | |
| 2004/0093211 A1 | 5/2004 | Reynolds et al. | |
| 2004/0122941 A1 | 6/2004 | Creamer et al. | |
| 2004/0176958 A1 | 9/2004 | Salmenkaita et al. | |
| 2005/0081152 A1 | 4/2005 | Commarford et al. | |
| 2005/0147219 A1 | 7/2005 | Comerford | |
| 2005/0201544 A1 | 9/2005 | Book et al. | |
| 2006/0245557 A1 | 11/2006 | Paden et al. | |
| 2006/0285657 A1 | 12/2006 | Lippke et al. | |
| 2007/0024454 A1 | 2/2007 | Singhal | |
| 2007/0081655 A1 | 4/2007 | Sun et al. | |
| 2007/0135101 A1 * | 6/2007 | Ramati et al. | 455/414.1 |
| 2008/0039010 A1 | 2/2008 | Vance et al. | |
| 2008/0046363 A1 | 2/2008 | Ali et al. | |
| 2008/0249936 A1 | 10/2008 | Miller et al. | |
| 2008/0298560 A1 | 12/2008 | Purdy et al. | |
| 2009/0042539 A1 | 2/2009 | Jiang et al. | |
| 2009/0048864 A1 * | 2/2009 | Kozlowski et al. | 705/2 |
| 2009/0094283 A1 | 4/2009 | Baudisch et al. | |
| 2010/0054430 A1 * | 3/2010 | Grigsby et al. | 379/88.03 |
| 2010/0067670 A1 * | 3/2010 | Grigsby et al. | 379/88.18 |
| 2011/0173119 A1 | 7/2011 | Kumar et al. | |
| 2012/0314848 A1 * | 12/2012 | Grigsby et al. | 379/88.01 |

OTHER PUBLICATIONS

United States Patent and Trademark Office, Office Action for U.S. Appl. No. 12/211,653, Oct. 11, 2011, pp. 1-13, Alexandria, VA, USA.
United States Patent and Trademark Office, Office Action for U.S. Appl. No. 12/211,653, Mar. 13, 2012, pp. 1-10, Alexandria, VA, USA.
United States Patent and Trademark Office, Office Action for U.S. Appl. No. 12/202,682, Mar. 2, 2012, pp. 1-7, Alexandria, VA, USA.
United States Patent and Trademark Office, Notice of Allowance for U.S. Appl. No. 12/202,682, Jun. 12, 2012, pp. 1-13, Alexandria, VA, USA.

* cited by examiner

VOICE RESPONSE UNIT SHORTCUTTING

RELATED APPLICATIONS

This application is a continuation of and claims priority to and claims the benefit of U.S. patent application Ser. No. 12/202,682 titled "VOICE RESPONSE UNIT SHORTCUTTING," which was filed in the United States Patent and Trademark Office on Sep. 2, 2008, which has a current status of "Allowed," and which is incorporated herein by reference in its entirety.

This application is also related to U.S. patent application Ser. No. 12/202,691, titled "VOICE RESPONSE UNIT MAPPING," which was filed in the United States Patent and Trademark Office on Sep. 2, 2008, the contents of which are hereby incorporated by reference. This application is further related to U.S. patent application Ser. No. 12/211,653, titled "VOICE RESPONSE UNIT HARVESTING," which was filed in the United States Patent and Trademark Office on Sep. 16, 2009, and to U.S. patent application Ser. No. 12/245,212, titled "VOICE RESPONSE UNIT PROXY UTILIZING DYNAMIC WEB INTERACTION," which was filed in the United States Patent and Trademark Office on Oct. 3, 2008.

BACKGROUND

This disclosure relates to voice response unit (VRU) telephony, and more particularly to a system and method for providing VRU shortcuts for end-users.

In telephony, interactive voice response (IVR) provides a phone technology that allows a computer or voice response unit (VRU) to detect voice and touch tones using a normal phone call. The VRU can respond with pre-recorded or dynamically generated audio to further direct callers on how to proceed. VRUs can be used to control almost any function where the interface can be broken down into a series of simple menu choices or options. Once constructed, VRUs generally scale well to handle large call volumes.

In operation, a caller dials a telephone number that is answered by the VRU. The VRU executes an application which is tied to the number dialed DNIS (Dialed Number Identification Service). As part of the application, prerecorded audio files or dynamically generated Text to Speech (TTS) audio explain the options available to the caller. The caller is given the choice to select options using DTMF tones or spoken words. Speech recognition may be used to carry out more complex transactions and simplifies the application menu structure.

Unfortunately, interfacing with a VRU can be annoying for people as the presentation of information is inherently slow. Accordingly, there is a need in the art for allowing users to more effectively navigate VRUs to obtain a desired goal.

BRIEF SUMMARY

The present invention relates to a system, method and program product for providing VRU shortcuts. In one embodiment, there is a system for providing voice response unit (VRU) shortcuts, comprising: a user interface for allowing a user to input a targeted VRU, a goal, and call-specific information; a data mapping system for mapping the call specific information and user information pre-stored in a database to a VRU map associated with VRU; a VRU interface system for initiating a call with the targeted VRU and navigating the targeted VRU to an option associated with the goal; and a system for telephonically connecting the user with the targeted VRU when the option associated with the goal is reached.

In a second embodiment, there is a computer readable medium having a program product stored therein for providing voice response unit (VRU) shortcuts, comprising: program code for allowing a user to input a targeted VRU, a goal, and call-specific information; program code for mapping the call specific information and user information pre-stored in a database to a VRU map associated with VRU; program code for initiating a call with the targeted VRU and navigating the targeted VRU to an option associated with the goal; and program code for telephonically connecting the user with the targeted VRU when the option associated with the goal is reached.

In a third embodiment, there is a method of providing voice response unit (VRU) shortcuts, comprising: receiving as input a targeted VRU, a goal, and call-specific information; mapping the call specific information and user information pre-stored in a database to a VRU map associated with VRU; initiating a call with the targeted VRU and navigating the targeted VRU to an option associated with the goal; and telephonically connecting the user with the targeted VRU when the option associated with the goal is reached.

In a fourth embodiment, there is a method for deploying a system for providing voice response unit (VRU) shortcuts, comprising: providing a computer infrastructure being operable to: receive as input a targeted VRU, a goal, and call-specific information; map the call specific information and user information pre-stored in a database to a VRU map associated with VRU; initiate a call with the targeted VRU and navigating the targeted VRU to an option associated with the goal; and telephonically connect the user with the targeted VRU when the option associated with the goal is reached.

The illustrative aspects of the present invention are designed to solve the problems herein described and other problems not discussed.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings.

Figure 1:
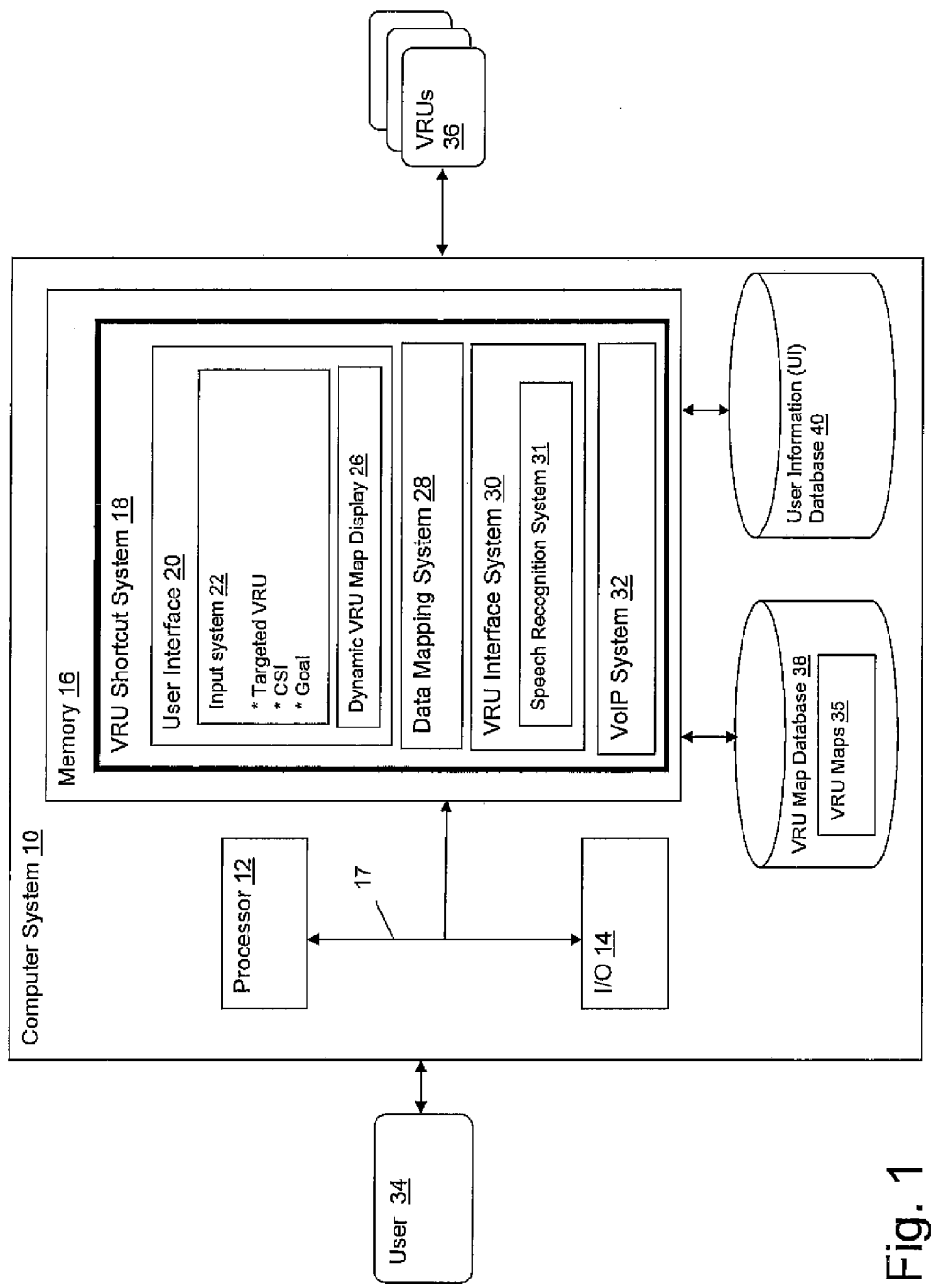
FIG. 1 depicts a computer system having a VRU shortcut system in accordance with an embodiment of the present invention.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Referring to FIG. 1, a computer system 10 is shown having a VRU (voice response unit) shortcut system 18 that automatically navigates a targeted VRU 36 for a user 34. In particular, VRU shortcut system 18 will reduce the amount of time the user has to spend interfacing with the targeted VRU 36 by performing as much of the interaction as possible without user involvement. In some instances, aside from speaking with a representative, almost all of the interactions can be accomplished with information provided up front.

VRU shortcut system 18 includes a user interface 20 that allows user 34 to enter a targeted VRU, call specific information (CSI), and a goal. The targeted VRU represents the VRU that the user 34 wishes to call. Call specific information (CSI) represents data that is specific to a given call with the targeted VRU. For instance, if a user was call an airline, the CSI may comprise a reservation number. The goal represents the goal the user 34 requires from the VRU, e.g., speaking with a representative about the airline reservation.

In addition to the information provided by the user 34, a user information (UI) database 40 is also provided for storing information about the user 34, e.g., name, address, account information, date of birth, etc. UI database 40 may be stored locally (as shown) or be implemented remotely, e.g., by a third party service. Regardless, data mapping system 28 utilizes both the information collected from the input system 22 and information from the UI database 40 to provide a shortcut for the user 34 to an option in the VRU associated with the inputted goal.

To implement the shortcut, a VRU map 35 for the targeted VRU 36 is identified from the VRU map database 38. Each VRU map 35 is essentially a hierarchical representation of the options and functions associated with a given VRU 36. An example VRU map 35 is shown below with regard to FIG. 4. VRU maps 35 can be collected or built in any manner. Based on the inputted goal, a path can be determined for navigating the VRU map 35 to an option associated with the goal. Data mapping system 28 may be utilized to determine what information is required to reach the goal, and then map the information to the VRU map 35 (e.g., by storing information in the VRU map 35, linking the information to options in the VRU map 35, etc).

VRU interface system 30 initiates the call with the targeted VRU 36 and begins navigating the VRU 36 along the path determined to achieve the goal. When information is required by the VRU 36 to proceed (e.g., "please enter your account number"), the information is provided by the data mapping system 28. Data may be entered into the VRU 36, e.g., by generating tones or via a text to voice generation system that speaks the information.

In an alternative embodiment, a speech recognition system 31 may be employed to determine what information is required in a dynamic manner. Data mapping system 28 would then dynamically retrieve the information on the fly as required.

In an illustrative case where the desired goal is to have the user 34 speak with a representative or otherwise telephonically engage with the VRU at some predetermined point in the VRU map, a voice over IP (VoIP) system 32 is provided to connect the user to the VRU 36.

A dynamic VRU map display 26 may be provided to allow the user 34 to view VRU map 35, as well as the progress of the VRU shortcut system 18 as it navigates the VRU 36.

Consider an example where user 34 is interested in obtaining information from an airline VRU 36 regarding a flight. The user 34 first navigates a web browser (or other client device) to the VRU shortcut system 18, where the user 34 already has personal information securely stored in the UI database 40, such as name, date of birth, last four of SSN, possibly a credit card number, etc. User 34 then selects the targeted VRU in the user interface 20, provides flight information (i.e., CSI) into one or more fields on the user interface 20, then clicks "connect me with a representative regarding my reservation." The data mapping system 28 parses the flight information and extracts dates and times, confirmation number, flight number, preferences, etc. VRU interface system 30 then calls the airline and navigates the menu options, e.g., using speech recognition and the associated VRU map 35. When asked to provide flight information or personal information, it is entered if present. If not, the user 34 is prompted via the user interface 20. When the call is finally at a point where a representative is being contacted, the VRU shortcut system 18 provides a VoIP call to connect the user 34 to the representative.

Figure 2:
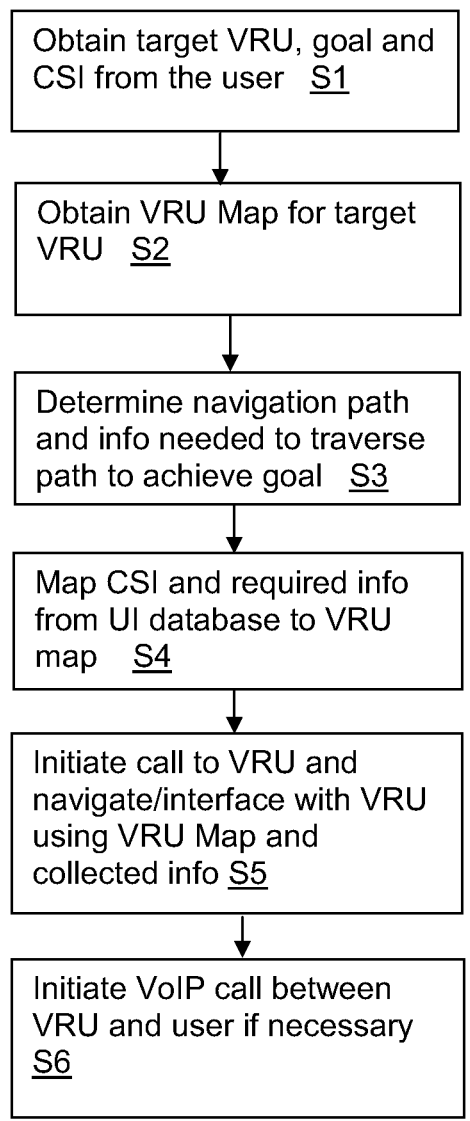
FIG. 2 depicts a flow chart showing a method in accordance with an embodiment of the present invention.

FIG. 2 depicts a flow diagram of a method of implementing VRU shortcut system 18. At S1, a targeted VRU, a goal, and call specific information (CSI) are obtained from the user via a user interface. Next at S2 the VRU map for the targeted VRU is obtained. At S3, a navigation path and any information needed to traverse the path is determined. At S4, the required information to traverse the path is mapped the VRU map. At S5, a call is initiated to the targeted VRU, and the VRU is navigated along the determined navigation path. Information mapped to the VRU map is presented to the VRU as required. In the event additional information is required, the user could be pinged via the user interface. Finally, at S6, a Von' call can be initiated between the user and the VRU if necessary.

Figure 3:
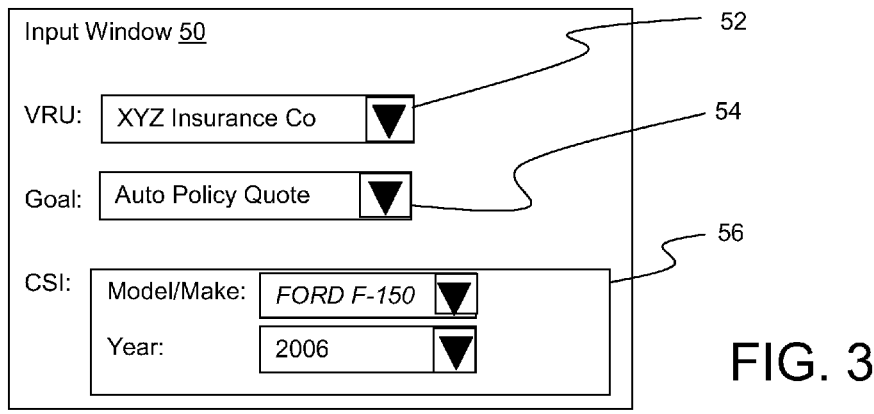
FIG. 3 depicts a user interface showing an input window in accordance with an embodiment of the present invention.
Figure 4:
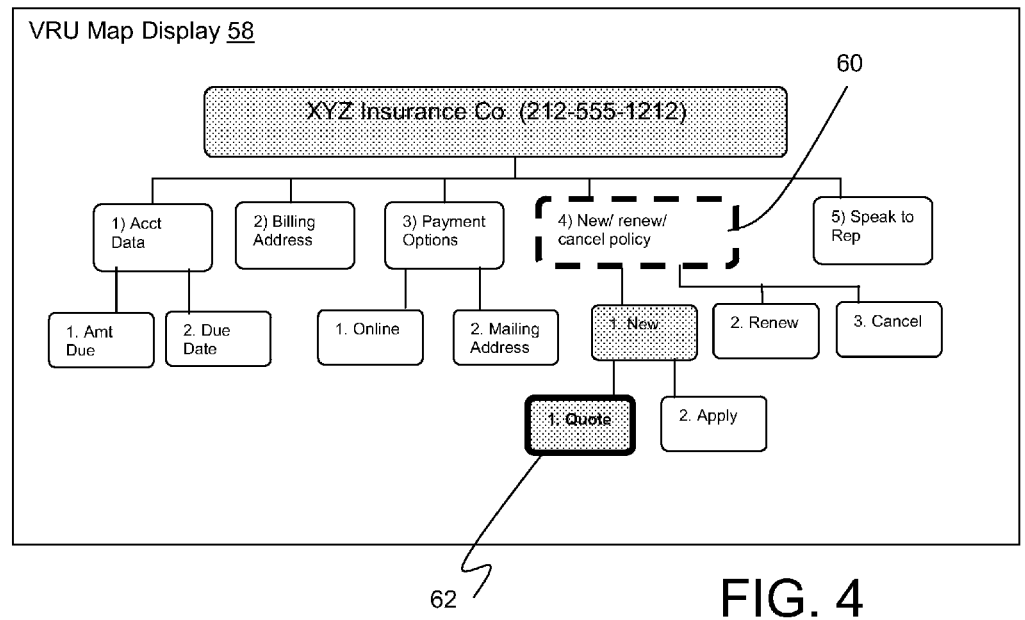
FIG. 4 depicts a user interface showing an dynamic VRU map in accordance with an embodiment of the present invention.

FIGS. 3 and 4 depict illustrative user interface windows for VRU shortcut system 18. FIG. 3 depicts an input window 50 for inputting a targeted VRU 52, a goal 54 and call-specific information (CSI) 56. In this example, each of the inputs utilize drop down menus. In an illustrative embodiment, the choices for the goal 54 may be dependent upon the selected VRU 52. Similarly, the CSI choices may be dependent upon the selected VRU 52 and/or goal 54. In this example, the user has selected XYZ insurance company as the targeted VRU 52, the goal 54 is to obtain an auto policy quote, and the CSI includes model/make and year information for an auto.

FIG. 4 depicts a VRU map display 58 that depicts a VRU map containing all of the hierarchical options for the VRU selected in FIG. 3. Also shown is the navigation path (shaded options) that must be traversed to reach an option 62 associated with the goal. In this example, option 62 "quote" is highlighted with a bold line to indicate that it is the goal of the shortcut. Also shown in a dashed highlighting is the current option 60 being presently traversed by the VRU shortcut system 18. This allows the user to easily view the progress of the call. In this case, when the process reaches option 62 "quote," the VRU may ask for the make/model/year of the auto, as well as the user's age and address in order for a representative to generate a quote. The make/model/year information is obtained from the input window 50, while the user's age and address would be retrieved from the user information database 40 (FIG. 1). Once all of the information is entered, the VRU shortcut system 18 could initiate a call between the user and the VRU. It is understood that the interface windows shown in FIGS. 3 and 4 are for illustrative purposes and other embodiments could be used and thus fall within the scoped of the invention.

Referring again to FIG. 1, it is understood that computer system 10 may be implemented as any type of computing infrastructure. Computer system 10 generally includes a processor 12, input/output (I/O) 14, memory 16, and bus 17. The processor 12 may comprise a single processing unit, or be distributed across one or more processing units in one or more locations, e.g., on a client and server. Memory 16 may comprise any known type of data storage, including magnetic media, optical media, random access memory (RAM), readonly memory (ROM), a data cache, a data object, etc. Moreover, memory 16 may reside at a single physical location, comprising one or more types of data storage, or be distributed across a plurality of physical systems in various forms.

I/O 14 may comprise any system for exchanging information to/from an external resource. External devices/resources may comprise any known type of external device, including a monitor/display, speakers, storage, another computer system, a hand-held device, keyboard, mouse, voice recognition system, speech output system, printer, facsimile, pager, etc. Bus 17 provides a communication link between each of the components in the computer system 10 and likewise may comprise any known type of transmission link, including electrical, optical, wireless, etc. Although not shown, additional components, such as cache memory, communication systems, system software, etc., may be incorporated into computer system 10.

Access to computer system 10 may be provided over a network such as the Internet, a local area network (LAN), a wide area network (WAN), a virtual private network (VPN), etc. Communication could occur via a direct hardwired connection (e.g., serial port), or via an addressable connection that may utilize any combination of wireline and/or wireless transmission methods. Moreover, conventional network connectivity, such as Token Ring, Ethernet, WiFi or other conventional communications standards could be used. Still yet, connectivity could be provided by conventional TCP/IP sockets-based protocol. In this instance, an Internet service provider could be used to establish interconnectivity. Further, as indicated above, communication could occur in a client-server or server-server environment.

It should be appreciated that the teachings of the present invention could be offered as a business method on a subscription or fee basis. For example, a computer system 10 comprising a VRU shortcut system 18 could be created, maintained and/or deployed by a service provider that offers the functions described herein for customers. That is, a service provider could offer to deploy or provide VRU shortcuts as described above.

It is understood that in addition to being implemented as a system and method, the features may be provided as a program product stored on a computer-readable medium, which when executed, enables computer system 10 to provide a VRU shortcut system 18. To this extent, the computer-readable medium may include program code, which implements the processes and systems described herein. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computing device, such as memory 16 and/or a storage system.

As used herein, it is understood that the terms "program code" and "computer program code" are synonymous and mean any expression, in any language, code or notation, of a set of instructions that cause a computing device having an information processing capability to perform a particular function either directly or after any combination of the following: (a) conversion to another language, code or notation; (b) reproduction in a different material form; and/or (c) decompression. To this extent, program code can be embodied as one or more types of program products, such as an application/software program, component software/a library of functions, an operating system, a basic I/O system/driver for a particular computing and/or I/O device, and the like.

Further, it is understood that terms such as "component" and "system" are synonymous as used herein and represent any combination of hardware and/or software capable of performing some function(s).

The block diagrams in the figures illustrate the architecture, functionality, and operation of possible implementations of systems, methods and computer program products according to various embodiments of the present invention. In this regard, each block in the block diagrams may represent a module, segment, or portion of code, which comprises one or more executable instructions for implementing the specified logical function(s). It should also be noted that the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams can be implemented by special purpose hardware-based systems which perform the specified functions or acts, or combinations of special purpose hardware and computer instructions.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A system for providing voice response unit (VRU) shortcuts, comprising:
   a data mapping system that maps call specific information input by a user and user information pre-stored in a database to a VRU map associated with a targeted VRU;
   a VRU interface system that initiates a call with the targeted VRU and navigates the targeted VRU to an option associated with a user goal input by the user; and
   a VRU map display that displays the VRU map and displays to the user progress of the navigation of the targeted VRU during the call on the displayed VRU map as the targeted VRU is navigated.

2. The system of claim 1, where:
   the VRU map display further highlights an option associated with the user goal on the displayed VRU map; and
   in displaying to the user the progress of the navigation of the targeted VRU during the call on the displayed VRU map as the targeted VRU is navigated, the VRU map display highlights a current location in a navigation path on the displayed VRU map as the targeted VRU is navigated.

3. The system of claim 1, where the data mapping system further:
   determines a navigation path of the targeted VRU;
   determines information usable to traverse the navigation path of the targeted VRU; and
   maps the information usable to traverse the navigation path of the targeted VRU to the VRU map.

4. The system of claim 3, where, in navigating the targeted VRU to the option associated with the user goal input by the user, the VRU interface system presents the information usable to traverse the navigation path that is mapped to the VRU map to the targeted VRU to traverse the navigation path of the targeted VRU to the option associated with the user goal input by the user.

5. The system of claim 1, further comprising a user interface system that receives the call specific information from the user to input to the targeted VRU during the navigation of the targeted VRU.

6. The system of claim 1, where the VRU interface system enters the call specific information mapped to the VRU map as the targeted VRU is navigated.

7. The system of claim 6, further comprising:
a user interface system; and
where, in response to the VRU interface system determining that additional information beyond the call specific information mapped to the VRU map is to be entered to the targeted VRU:
the user interface system prompts the user for the additional information; and
the VRU interface system enters the additional information to the targeted VRU.

8. A computer program product for providing voice response unit (VRU) shortcuts, comprising:
a computer readable storage medium having computer readable program code embodied therewith, where the computer readable program code when executed on a computer causes the computer to:
map call specific information input by a user and user information pre-stored in a database to a VRU map associated with a targeted VRU;
initiate a call with the targeted VRU and navigate the targeted VRU to an option associated with a user goal input by the user; and
display the VRU map and display to the user progress of the navigation of the targeted VRU during the call on the displayed VRU map as the targeted VRU is navigated.

9. The computer program product of claim 8, where the computer readable program code when executed on the computer further causes the computer to:
highlight an option associated with the user goal on the displayed VRU map; and
in causing the computer to display to the user the progress of the navigation of the targeted VRU during the call on the displayed VRU map as the targeted VRU is navigated, the computer readable program code when executed on the computer causes the computer to highlight a current location in a navigation path on the displayed VRU map as the targeted VRU is navigated.

10. The computer program product of claim 8, where the computer readable program code when executed on the computer further causes the computer to:
determine a navigation path of the targeted VRU;
determine information usable to traverse the navigation path of the targeted VRU; and
map the information usable to traverse the navigation path of the targeted VRU to the VRU map.

11. The computer program product of claim 10, where, in causing the computer to navigate the targeted VRU to the option associated with the user goal input by the user, the computer readable program code when executed on the computer causes the computer to present the information usable to traverse the navigation path that is mapped to the VRU map to the targeted VRU to traverse the navigation path of the targeted VRU to the option associated with the user goal input by the user.

12. The computer program product of claim 8, where the computer readable program code when executed on the computer further causes the computer to receive the call specific information from the user to input to the targeted VRU during the navigation of the targeted VRU.

13. The computer program product of claim 8, where the computer readable program code when executed on the computer further causes the computer to enter the call specific information mapped to the VRU map as the targeted VRU is navigated.

14. The computer program product of claim 13, where:
in response to determining that additional information beyond the call specific information mapped to the VRU map is to be entered to the targeted VRU, the computer readable program code when executed on the computer further causes the computer to:
prompt the user for the additional information; and
enter the additional information to the targeted VRU.

15. A method for providing voice response unit (VRU) shortcuts, comprising:
mapping call specific information input by a user and user information pre-stored in a database to a VRU map associated with a targeted VRU;
initiating a call with the targeted VRU and navigating the targeted VRU to an option associated with a user goal input by the user; and
displaying the VRU map and displaying to the user progress of the navigation of the targeted VRU on the displayed VRU map during the call as the targeted VRU is navigated.

16. The method of claim 15, further comprising:
highlighting an option associated with the user goal on the displayed VRU map; and
where, displaying to the user the progress of the navigation of the targeted VRU during the call on the displayed VRU map as the targeted VRU is navigated comprises highlighting a current location in a navigation path on the displayed VRU map as the targeted VRU is navigated.

17. The method of claim 15, further comprising:
determining a navigation path of the targeted VRU;
determining information usable to traverse the navigation path of the targeted VRU; and
mapping the information usable to traverse the navigation path of the targeted VRU to the VRU map.

18. The method of claim 17, where navigating the targeted VRU to the option associated with the user goal input by the user comprises presenting the information usable to traverse the navigation path that is mapped to the VRU map to the targeted VRU to traverse the navigation path of the targeted VRU to the option associated with the user goal input by the user.

19. The method of claim 15, further comprising receiving the call specific information from the user to input to the targeted VRU during the navigation of the targeted VRU.

20. The method of claim 15, further comprising entering the call specific information mapped to the VRU map as the targeted VRU is navigated.

21. The method of claim 20, further comprising:
in response to determining that additional information beyond the call specific information mapped to the VRU map is to be entered to the targeted VRU:
prompting the user for the additional information; and
entering the additional information to the targeted VRU.

* * * * *